United States Patent Office 3,383,402
Patented May 14, 1968

3,383,402
SYNTHESIS OF DIMETHYL BIBENZOATE
Robert P. Yunick, Schenectady, N.Y., assignor to Schenectady Chemicals, Inc., Schenectady, N.Y., a corporation of New York
No Drawing. Filed Apr. 13, 1965, Ser. No. 447,886
12 Claims. (Cl. 260—475)

ABSTRACT OF THE DISCLOSURE 4,4'-dimethyl bibenzoate is prepared by reacting 4,4'-diacetyl biphenyl with a member of the group consisting of an alkali metal hypochlorite and an alkaline earth metal hypochlorite in a solvent comprising aqeous methanol.

---

This invention relates to the preparation of 4,4'-dimethyl bibenzoate having the formula

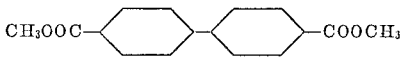

4,4'-dimethyl bibenzoate is useful as a starting material for making polyesters, e.g., it can be reacted with ethylene glycol to form fibers forming polymer or to form polymers useful as films for protective purposes and it can be used in making polyester wire enamels. However, the methods presently available for making this compound are expensive and do not result in the desired yields.

Accordingly it is an object of the present invention to devise an improved method for forming 4,4'-dimethyl bibenzoate.

Another object is to prepare 4,4'-dimethyl bibenzoate from 4,4'-diacetyl biphenyl.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by haloform oxidation of 4,4'-diacetyl biphenyl in aqeous methanol.

While these can be employed an alkaline earth hypochlorite such as calcium hypochlorite or barium hypochlorite it has been found that the use of an alkali metal hypochlorite, e.g. sodium hypochlorite or, more preferably, potassium hypochlorite gives much superior results as the oxidizing agent.

The use of alkaline earth metal hypochlorite has the disadvantage that it forms a soap which comes out as a sludge. Additionally the yields of dimethyl bibenzoate are greatly reduced as compared with the use of the alkali metal hypochlorite.

In order to avoid byproduct formation and decrease problems of purification preferably there is employed a pure form of the hypochlorite.

The alkali metal hypochlorite can be formed by reacting potassium or sodium hydroxide with calcium hypochlorite and removing the calcium carbonate precipitate. Alternatively sodium or potassium hypochlorite can be made readily from sodium or potassium hydroxide and chlorine at near 0° C.

In forming the dimethyl bibenzoate from the hypochlorite and 4,4'-diacetyl biphenyl it is essential to use aqueous methanol. The water is necessary to keep the hypochlorite soluble and the methanol is necessary to attack the intermediate trihaloketone and form the methyl ester. Without the use of methanol the product is 4,4'-bibenzoic acid.

In order to insure complete reaction of the 4,4'-diacetyl biphenyl there should be used at least 2 moles of methanol per mole of diacetyl biphenyl. The upper limit on the methanol is such that there be enough water in the mixture to keep the potassium hypochlorite or sodium hypochlorite, for example, soluble. The lower limit on the amount of methanol in the water-methanol is that amount which will keep the diacetyl biphenyl soluble.

The water can range from 10 to 75% and the methanol from 90 to 25% of the water-methanol mixture by weight.

Unless otherwise indicated all parts and percentages are by weight.

The reaction temperature is preferably between 15 and 35° C. but can be from 0° C. to the boiling point of the solvent mixture, e.g., 100° C. For highest yields the reaction time is usually limited to 0.5–1 hour.

To obtain good yields of the dimethyl bibenzoate there should be used at least 6 moles of alkali metal hypochlorite, e.g. potassium hypochlorite, per mole of diacetyl biphenyl. There can be used as much as 12 moles of alkali metal hypochlorite per mole of diacetyl biphenyl. When employing an alkaline earth metal hypochlorite, e.g. calcium hypochlorite, there are used 3 to 6 moles per mole of diacetyl biphenyl.

It has also been found that preferably the aqueous methanol does not contain any additional solvent.

When an additional solvent is employed it can be used in an amount up to 50% of the total solvent weight. Examples of such additional solvents are tetrahydrofuran, benzene, hexane, dimethyl sulfone, alkyl acetates, e.g. methyl acetate, ethyl acetate, propyl acetate and butyl acetate. The preferred additional solvent is a lower alkyl acetate such as ethyl acetate.

The diacetyl biphenyl can be employed in an amount of from 0.1% of the weight of the total mixture up to 1 mole per 2 moles of methanol.

It is critical to use aqueous methanol since replacing the aqueous methanol by aqueous ethanol may not result in the formation of diethyl bibenzoate.

Unless the reaction condition set forth in the present invention are used the yields of the desired 4,4'-dimethyl bibenzoate are extremely low. Thus in one method there was obtained a 91.7% yield of 4,4'-biphenyl dicarboxylic acid. In contrast when utilizing aqueous methanol at room temperature as described in the present invention the amount of 4,4'-biphenyl dicarboxylic acid was reduced to 10% and the amount of 4,4'-dimethyl bibenzoate was 66% of pure material and there was an additional 8% of impure dimethyl bibenzoate.

EXAMPLE 1

A solution of potassium hypochlorite was made by adding a warm solution of 42 grams (0.75 mole) of potassium hydroxide and 518 grams (3.75 mole) of potassium carbonate in 600 ml. of water to a solution of 535 grams (70% pure equivalent to 374 grams or 2.62 mole) calcium hypochlorite (2.33 times theory) in 1850 ml. of water at 60° C. After thorough stirring the precipitate of calcium carbonate was filtered off and the filtrate was added over a 64-minute period at 25–30° C. to a mixture of 90 grams (0.375 mole) of 4,4'-diacetyl biphenyl in 1500 ml. of methanol. The suspension was stirred for one hour and filtered. The solid was washed thoroughly with 1 liter of water and this was combined with the filtrate. The remaining precipitate was washed with 1 liter of 3 normal hydrochloric acid and an additional 1 liter of water. The dried solid was extracted with 1 liter of benzene in a Soxhlet Extractor to give 67.3 grams (65.9%) of 4,4'-dimethyl bibenzoate melting at 216–217° C. Its infrared spectrum matched exactly that of a pure sample. Additional crops of crystals totalled 8.1 grams (8.27%) and melted at various ranges from 130 to 171° C. The reaction filtrate was acidified with concentrated hydrochloric acid to give a precipitate of 20.1 grams (21.97%) of 4,4'-diphenyl dicarboxylic acid.

The dimethyl bibenzoate formed had a saponification equivalent of 412.5 (average of two runs) as against theory of 415.2. The purity of the product was 99.35%.

EXAMPLE 2

Potassium hypochlorite solution was made from 35 grams (0.25 mole) of potassium carbonate and 5.5 grams (0.1 mole) of potassium hydroxide in 70 ml. of water with 36 grams (70% pure, 25.2 grams or 0.176 mole, 1.17 times theory) of calcium hypochlorite in 136 ml. of water at 80° C. After filtering and washing the solid with 24 ml. of water, the filtrate was added dropwise over a 32-minute period at 28–30° C. to a mixture of 12 grams (0.05 mole) of 4,4'-diacetyl biphenyl in 200 ml. of methanol and 400 ml. of ethyl acetate. The reaction mixture was stirred for 30 minutes and the product isolated as in Example 1 to give 6.2 grams (45.9%) of 4,4'-dimethyl bibenzoate melting at 211–212° C., and 1.85 grams (13.7%) of additional crops melting at 207–213° C. The yield of 4,4'-biphenyl dicarboxylic acid was 1.50 grams (12.4%).

EXAMPLE 3

When employing potassium hypochlorite made from potassium hydroxide and chlorine rather than from calcium hypochlorite in the process of Example 1 (3.75 moles of potassium hypochlorite in 2500 ml. of water) similar results to those obtained in Example 1 were reached. The byproduct 4,4'-biphenyl dicarboxylic acid was reduced to about 10%.

EXAMPLE 4

The procedure of Example 2 was repeated using twice the amount of calcium hypochlorite, potassium carbonate and hydroxide. The addition of the potassium hypochlorite solution to the diacetyl biphenyl solution required 55 minutes at 29–32° C. and the reaction mixture was stirred for 30 minutes. The reaction yielded 7.5 grams (55.5%) of 4,4'-dimethyl bibenzoate melting at 211–212° C., a second crop of 0.95 gram (6.6%) melting at 205–208° C. and 1.42 grams (11.8%) of 4,4'-biphenyl dicarboxylic acid.

What is claimed is:

1. A process of preparing 4,4'-dimethyl bibenzoate comprising reacting 4,4'-diacetyl biphenyl with a member of the group consisting of an alkali metal hypochlorite and an alkaline earth metal hypochlorite in a solvent comprising aqueous methanol.

2. A process according to claim 1 wherein the hypochlorite is selected from the group consisting of sodium hypochlorite, potassium hypochlorite and calcium hypochlorite and when the hypochlorite is either sodium or potassium hypochlorite there is employed 6–12 moles hypochlorite per mole of diacetyl biphenyl and when the hypochlorite is calcium hypochlorite there is employed 3–6 moles hypochlorite per mole of diacetyl biphenyl.

3. A process according to claim 1 wherein the water is 10 to 75% and the methanol 90 to 75% of the total of water and methanol.

4. A process according to claim 3 wherein the solvent consists of aqueous methanol.

5. A process of preparing 4,4'-dimethyl bibenzoate comprising reacting 4,4'-diacetyl biphenyl with an alkali metal hypochlorite wherein the alkali metal has an atomic weight of 23 to 39 in a solvent comprising aqueous methanol and the alkali metal hypochlorite is used in the amount of at least 6 moles per mole of diacetyl biphenyl.

6. A process according to claim 5 wherein the water is 10 to 75% and the methanol is 90 to 25% of the total of water and methanol and the alkali metal hypochlorite is employed in an amount of 6–12 moles per mole of diacetyl biphenyl and the temperature is between 0–100° C.

7. A process according to claim 6 wherein the reaction time is 0.5 to 1 hour.

8. A process according to claim 5 wherein the water is 10 to 75% and the methanol 90 to 25% of the total of water and methanol.

9. A process according to claim 8 wherein the solvent consists of aqueous methanol.

10. A process according to claim 9 wherein the reaction temperature is 15–35° C.

11. A process according to claim 10 wherein the diacetyl biphenyl is from 0.1% of the mixture up to 1 mole per 2 moles of methanol.

12. A process according to claim 11 wherein the alkali metal hypochlorite is potassium hypochlorite.

References Cited

Theilheimer: Synthetic Methods of Organic Chemistry, vol. 13, S. Karger, N.Y., 1959, p. 157.

Migrdichian: Organic Synthesis, vol. I, Reinhold, N.Y., 1957, p. 311.

LORRAINE A. WEINBERGER, *Primary Examiner.*

T. L. GALLOWAY, *Assistant Examiner.*

UNITED STATES PATENT OFFICE
CERTIFICATE OF CORRECTION

Patent No. 3,383,402　　　　　　　　　　　　　　May 14, 1968

Robert P. Yunick

It is certified that error appears in the above identified patent and that said Letters Patent are hereby corrected as shown below:

Column 1, line 25, "fibers" should read -- fiber --; line 63, "hydroxide" should read -- carbonate --.

Signed and sealed this 18th day of November 1969.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents